United States Patent Office 3,725,104
Patented Apr. 3, 1973

3,725,104
METHOD OF PROVIDING AND DEVELOPING HIDDEN ENTRIES
Robert D. Fraik, Lincoln Township, Washington County, Minn., assignor to Minnesota Mining and Manufacturing Company, St. Paul, Minn.
No Drawing. Continuation-in-part of application Ser. No. 822,287, May 6, 1969. This application Mar. 26, 1970, Ser. No. 23,036
Int. Cl. B41m 5/12, 5/18
U.S. Cl. 117—1.7                     5 Claims

ABSTRACT OF THE DISCLOSURE

The discolored paper-based feedback systems employ thermographic processes which transfer a pattern of vaporized reactant material selected from the group consisting of: dithiooxamide, the $N,N^1$-disubstituted derivatives of dithiooxamide, and an iron-complexing compound having a benzene ring and at least two hydroxyl groups substituted in adjacent positions on said ring to a treated or untreated paper-like receptor sheet to form a storable latent image, i.e. a hidden entry, on the sheet. The latent image can be developed weeks or months later with a coreactant metal salt.

---

This application is a continuation-in-part of my copending application Ser. No. 822,287, filed May 6, 1969, and now abandoned.

This invention relates to hidden entry technology. That is, this invention relates to a method of providing a storable latent image which can easily be developed at a later time. The invention finds utility in education, toys, games, and any other field in which a latent image or pattern of indicia should be invisible to the naked eye until a desired time (e.g. when the student or player responds or chooses a response to a problem or a game situation).

Most of the development in the field of hidden entry printing has centered around educational applications. See, for example, U.S. Pat. 3,363,336, to B. F. Skinner, issued Jan. 16, 1968. Various training and testing procedures, particularly the more complex ones, require feedback systems. "Feedback" has been defined as "information transfer from the instructional material to the student after a response is made by the student"; see page 1 of a report sponsored by The Southwest Regional Laboratory for Educational Research & Development (the SWRL), by Joel Strandberg, Ed. D., entitled "Feedback Systems for Use With Paper-Based Instructional Products," dated Feb. 14, 1969. "Paper-based" feedback products are, generally speaking, receptor or copy sheets, cards, or the like, containing hidden information which can be chemically or physically revealed. As compared to mechanical or electrical visual devices such as teaching machines, paper-based products are economical and relatively simple to manufacture and use. Some paper-based products are limited to imparting "true/false" or "yes/no" feedback and hereinafter are said to have "coded feedback capability"; others can feed back detailed information, thereby stimulating high levels of reasoning leading to a subsequent response, and hereinafter are said to have "latent image feedback capability." In the former systems, only a color code or a property of the ink or background of the receptor sheet is hidden; in the latter, an entire printed text is hidden. Needless to say, "latent image feedback capability" can be adapted to provide "coded feedback capability," but not vice versa. The prior art systems, regardless of feedback capability, are based upon mimeographing, spirit duplicating, electrostatic photocopying, or high-production printing technology. A number of difficult problems are encountered when these techniques are adapted to paper-based feedback systems.

One of the most difficult problems is to devise a means for providing a copy or receptor sheet with truly invisible and indetectible latent images or latent coded feedback.

A second, closely related problem is the visibility or legibility of the feedback. The relationship between the first and second problem is this: hidden images or codes which are truly invisible tend to be poorly legible upon development, and, conversely, the more legible or visible feedback systems are not free of visual cues prior to development. In other words, solutions to the two problems tend to be mutually exclusive.

A third problem concerns the efficiency of obtaining the feedback. The ideal system would be virtually instantaneous. Unfortunately, some chemical systems are slow, involving reaction times of a second or more. When an image is physically hidden by an overlay of ink, varnish, powder or the like, the overlay must be laboriously scraped off or erased, an even slower and certainly more cumbersome process of obtaining feedback than most chemical systems.

A fourth problem is the adaptability of the system to short runs and small-scale production. Ideally, educational tests should be revised frequently and should be economically reproduced in small quantities. Most printing (as opposed to duplicating) methods, even offset and letterpress techniques, require large runs to be economical.

A fifth problem relates to the extent of adaptation required to convert a printing, mimeographing, duplicating, or photocopying technique to paper-based feedback systems. With some systems, equipment which may already be available to the educational institution cannot be used as such, but must be specially modified in order to produce paper sheets with feedback capability. Ideally, an inexpensive, short-run production system should be capable of being used with unmodified, existing equipment. Likewise, it is obviously desirable that the feedback system be operative using ordinary, untreated paper, and the means for developing, revealing, or activating the feedback should be simple and economical.

Two proposed chemical systems have latent image feedback capability. Both involve revealing the latent image through the use of a chemical pen containing a coreactant for the active chemical component of the image. In both systems, it is very difficult to avoid the twin dilemma of visible cues prior to image development or illegible images after development. One system utilizes letterpress printing and the other is a spirit duplicating process. The spirit duplicating method has the advantage of being adaptable to short-run production, but it appears to have a tendency to involve long reaction times and to produce rather weakly visible images. The chemistry and procedural steps of spirit duplicating can be found in U.S. Pat. 3,076,406, issued Feb. 5, 1963 to Robert T. Florence.

Accordingly, this invention contemplates a paper-based feedback system utilizing hidden entry printing wherein a truly invisible latent image (printed on a receptor sheet by equipment now available and capable of economical short-run production) is rapidly and efficiently made visible with a chemical reactant.

This invention also contemplates a method of providing the feedback system and an easy to use, economically made writing instrument for dispensing the chemical reactant which makes the image visible.

Briefly, this invention involves adapting the technology of thermographic reproduction to paper-based feedback systems. Typical thermographic processes are described in U.S. Pat. 3,094,417, issued June 18, 1963 to Workman and U.S. Pat. 3,280,735, issued Oct. 25, 1966 to Clark et al. The Clark et al. process, inter alia, involves the use of a master sheet coated with a heat transferable chemical. The master sheet is imaged (e.g., typed, written, or printed upon) and placed in juxtaposition with a receptor sheet. The master and the receptor are then subjected to heat or infrared radiation, and a pattern of vaporized chemical corresponding to the master image is transferred to the receptor sheet.

In the latent image printing process of this invention, the vaporizable, heat transferable chemical alone does not produce a visible image. The vapor condenses on the surface of the receptor, which can consist of an untreated sheet of ordinary bond paper or punchcard stock, and thereby forms a stored, latent image. At a later time, as much as several weeks later, a chemical co-reactant is applied to the image area of the receptor sheet. The two chemicals react almost instantaneously to form a stable, colored complex and the image thereby becomes clearly visible and legible.

It is quite surprising that the thermoplastic reproduction technology of, for example, the Clark et al. Pat. 3,280,735 can be adapted to the field of paper-based feedback systems and hidden entry printing. Thermographic systems generally contemplate the use of a coated receptor sheet coated with a normally stably solid imaging reactant (i.e. dye precursor) which is easily vaporized or sublimed, or some other imaging means, e.g. a heat transferable, visible dye, for producing an immediately visible, rather than a latent, image. It would be expected that the heat-transferable chemical chemical condensed on the receptor sheet would have poor storage characteristics, i.e. poor "shelf life." It would further be expected that, as compared to spirit systems, a thermographic system would produce an inferior, relatively low-contrast image upon development with a co-reactant, regardless of the chemistry of the system. For example, in the spirit duplicating system referred to previously, the latent image-forming chemical is leached onto the receptor with a solvent, and it would be expected that far more of this chemical would be transferred to the receptor or copy sheet than is the case with heat-transfer systems. Surprisingly, however, the latent images produced by this invention are storable for long periods of time and produce relatively high-contrast visible images upon development.

The preferred method of this invention comprises the following steps:

(1) Providing a master or original for reproduction of the latent image: This step essentially involves printing, typing, or otherwise inscribing a master or original sheet with the intelligence which will be contained in the feedback. The image areas of the master will have a greater tendency to absorb heat or infrared energy than the uninscribed or background areas. Generally speaking, white, red and other infrared-reflecting colors provide suitable backgrounds, and black or other infrared absorbing colors provide suitable image areas. The master or original can be inscribed with typing, handwriting, photocopying, printing, or any other method which produces infrared absorbing images and a high contrast with the poorly-absorptive background. Notes or instructions not to be included in the latent image can be inscribed on the surface of the master in non-absorptive colors such as red or white.

(2) Juxtaposing original or master, vapor-supply medium, and receptor sheet: The imaged original or master is preferably placed on top of a receptor sheet which preferably is already inscribed with visible intelligence. That is, the receptor sheet will normally have been provided, by any suitable method, with visible instructional or other printed information, questions, pictorial representations and the like which will be arranged to be in register with the latent images to be formed. Alternatively, this visible image material can be provided by any means which does not develop the latent image, including the composite master system described subsequently. The background areas of the receptor sheet can be any color which provides high contrast with this visible material and the developed latent image, e.g. white or yellow. The most economical type of receptor sheet would consist essentially of ordinary bond paper, punchcard stock, or the like free of special coatings or other expensive treatments. However, the invention is not limited to untreated receptor sheets. Coatings or other treatments which do not render visible the latent image are consistent with the objectives of this invention. See, for example, U.S. Pat. 3,481,759 to D. A. Ostlie, issued Dec. 2, 1969, which describes the use of zinc salts in receptor sheet coatings. Zinc salts react with dithiooxamide or its derivatives to produce white or colorless complexes which are substantially invisible on a white backgound. It is also known that gallic acid and gallic acid esters, pyrogallol, catechol, and similar polyhydroxy benzene compounds form weak, colorless complexes with nickel salts. Interposed between the original or master and the receptor sheet is a layer of normally stably solid vaporizable reactant material, such as dithiooxamide, its derivatives, esters of gallic acid, and other materials described hereinafter. The layer can be in the form of a separate vapor supply sheet or a coating on the reverse side of the original. That is, the imaged original may comprise a sheet which is imaged with radiation-absorptive material on the first major surface and has a layer of the vaporizable reactant material on the second major surface.

The coating on the second major surface of the original sheet need not be coextensive in area with this surface but can consist of localized deposits. For example, the "layer" of normally stably solid vaporizable reactant material can be a mirror image of the image inscribed, typed, printed, etc., on the first surface of the master or original. This mirror image layer is provided as follows: (a) An original or master is placed against the transfer coating of a transfer sheet, the transfer coating containing a particulate material mixed with the vaporizable reactant material; (b) the first (exposed) surface of the master is typed, written, printed, or otherwise inscribed upon, using sufficient pressure to cause part of the aforementioned transfer coating to be deposited on the second (reverse) surface of the master in the form of a mirror image of the pattern of pressure applied to the first surface. See U.S. patent application Ser. No. 781,195, filed Dec. 4, 1968. If the master or original is an ordinary bond paper, the only vaporizable reactant material on the second surface is this mirror image, and heat-transfer of the mirror image to form a direct latent image on the receptor sheet can be effected with virtually any heat source, including infrared radiation, a heated roll, or a hot plate. If the master already has a coating or layer of dithiooxamide (or a derivative thereof) on the second surface, selective use of a transfer sheet having a transfer coating containing an ortho-dihydroxy or trihydroxy-benzene or -benzoic acid or ester (e.g. catechol, pyrogallol, galic acid, an alkyl gallate, etc.) will provide a composite master capable of vapor transferring two separate texts: a dithiooxamide text and, for example, an alkyl gallate text. A nickel-coated receptor sheet will image the dithiooxamide text immediately, but the gallate text will remain latent or hidden. Subsequent treatment of the gallate latent images with an iron salt will provide feedback.

The juxtaposition described above can be achieved by mounting the reverse side-coated master on a rotatable drum of an infrared duplicating machine and using receptor sheets as the feed.

(3) Irradiation: After the imaged original or master, the layer of vaporizable reactive material, and the receptor sheet have been properly juxtaposed, the imaged surface of the original or master is preferably exposed to intense infrared radiation. That is, the master is preferably between the radiation source and the receptor, the vapor-supply medium being interposed between master and receptor as described in step (2). The imaged portion of the original will naturally tend to absorb more radiation and become relatively hot compared to the poorly-absorptive background (including notes and instructions written in non-absorptive ink) or unimaged areas. Vapor will be caused to emanate from the layer of vaporizable reactant material in localized areas corresponding to the image on the master. The vapor will migrate or transfer to the receptor sheet.

(4) Condensation: Since the receptor sheet, regardless of whether it is punchcard stock or bond paper, contains no substances which are visibly reactive with the vapor from the vaporizable layer, the vapor will merely condense upon the fibers of the receptor sheet. Alternatively, the vapor will react with a chemical in the sheet which will produce a colorless compound or a colored compound which does not contrast with the background of the sheet. The result will be a latent image comprising stable, solid, invisible deposits of the condensate of (or the invisible product derived from) vaporizable reactant in localized areas corresponding to the image areas of the original sheet.

(5) Duplicating: Steps (3) and (4) can be repeated with additional receptor sheets many times. A single master or original sheet is capable of producing several dozen copies. Due to the ease and low cost if imaging a master, several hundred copies can be prepared economically. Steps (3) and (4) can be rapidly carried out on existing infrared copying or duplicating machines. Such machines are constructed and arranged to provide a line source of light including a tubular lamp having a linear filament and mounted within a focused reflective housing for progressive exposure of the printed surface of the original, all as described in Miller U.S. Pat. No. 2,740,895. Another suitable form of apparatus is described in Kuhrmeyer et al. U.S. Pat. No. 2,891,165.

(6) Developing the latent image: The latent image comprising the invisible deposits referred to previously can be rendered visible by treating the surface of the receptor sheet with an image-forming (i.e. a colored chemical complex-forming) co-reactant dissolved in a solvent also capable of dissolving the vaporizable reactant material. Suitable solvents include both polar and non-polar organic liquids such as the hydrocarbons, particularly cyclohexane; the alcohols, particularly ethanol; and aldehydes and ketones, such as acetone and methyl ethyl ketone. Mixtures of these solvents can be used to control volatility. The co-reactant can be dispensed from a writing instrument such as a felt-tipped pen, wherein the ink reservoir contains the co-reactant/solvent system; a wax crayon, wherein the wax itself serves as a reservoir, matrix, or solid solution medium for this system; or a sheet-like dispensing means such as a saturated blotter or a transfer sheet coated with a wax system similar to that of the wax crayon described previously. For example, U.S. Pat. No. 2,168,098 to J. Groak, issued Aug. 1, 1939 discloses a transfer sheet coated with a metal salt (e.g. an iron salt) admixed with a wax (e.g. an ester wax), a polymeric binder (e.g. starch), a material to facilitate the imaging reaction between the metal salt and a dye precursor such as gallic acid. The substrate for the coating is preferably flexible (e.g. paper) but can be more rigid than paper, e.g. a film of an organic synthetic polymer. Both the aforementioned transfer sheets and the wax crayons are particularly suitable for shipment with correspondence course materials. The wax crayons can comprise, for example, an organic or inorganic metal salt, a waxy polymer containing oxyalkylene units (e.g. polyoxyethylene glycols and esters or ethers thereof), and a reaction accelerator and/or a hardness controlling agent such as tributylphosphate and/or a secondary amine substituted with two hydroxy-lower alkyl groups (e.g. diethanol amine).

Other means can be used for dispensing the co-reactant and/or solvents and reaction accelerators, e.g., brush applicators, spray applicators, and the like. The development step is accelerated by organic trialkyl and triaryl phosphates such as tributyl phosphate and triphenyl phosphate. Tributyl phosphate can also be used in place of the above-mentioned solvents.

Method steps (1)–(5) described above are preferred because they provide good transfer of vaporizable reactive material to the receptor sheet. In short, various heat-transfer processes can be adapted for use with the present invention, including those which produce a mirror image and require the use of an intermediate transfer sheet and those in which the reverse side of the original or master contains a mirror image of vaporizable reactant material.

Excellent latent image feedback capability can be provided when the vaporizable reactant material is dithiooxamide (hereinafter referred to as DTO) or derivatives of DTO. The preferred co-reactants for these vaporizable materials are the organic carboxylic acid salts or inorganic salts of metals such as nickel, copper, cobalt, and cadmium. The preferred DTO derivatives are the $N,N'$-disubstituted compounds, e.g. $N,N'$-dibenzyl dithiooxamide (hereinafter referred to as DBDTO); $N,N'$-dimethyl dioxamide; $N,N'$-2-hydroxyethyl dithiooxamide; and other $N,N'$-di-organic radical-substituted DTO compounds. Since the vapor pressure of DTO is higher at room temperature than that of any of the $N,N'$-disubstituted DTO compounds, the DTO derivatives, particularly DBTDO, provide the most lasting, i.e. the most storable, latent images.

The organic carboxylic acid anions of the preferred metal salt co-reactants are preferably acetate, rosinate, oleate, 2-alkyl-hexanoate, or naphthenate. Other long-chain acid anions besides the rosinate and oleate are operative, e.g. the fatty acid anions such as stearate anion.

A receptor sheet properly provided with a latent image of one of the preferred vaporizable reactant materials can be developed with a preferred co-reactant to produce a dark, legible image weeks or even months after this receptor sheet has been prepared. Yet, prior to development, the latent image cannot be detected even under a microscope. DBDTO forms a latent image which can be developed to a visible image with a nickel salt from 3 to 10 months after the condensation step, provided the receptor sheet is kept in a closed file or drawer. Even when a DBDTO-imaged receptor sheet is mishandled, i.e. left exposed to freely-circulating air rather than kept within a closed space, weak but visible images can be developed even after six weeks or more of such mishandling.

Other chemical systems are adaptable for use with this invention. For example, dimethylglyoxine provides a latent image which is somewhat less storable but otherwise excellent. The known ortho-dihydroxy- or trihydroxyaromatic imaging compounds are also operative, e.g. gallic acid and its esters, pyrogallol, catechol, and derivatives of these, e.g. higher acyl-substituted pyrogallols. These ortho-di- or trihydroxyaromatic compounds do not provide colored complexes when reacted with nickel salts. However, they are known to coreact with iron salts to produce strongly colored complexes. Both inorganic iron salts such as ferric chloride or ferric nitrate and organic salts such as ferric benzoate or ferric octoate are suitable coreactants. Diphenyl carbazone, 5-diphenyl carbazide, $\alpha,\alpha'$-dipropyl, protocatechuic acid, 8-hydroxyguinoline, oxalic acid, 1-hydroxy-4-methoxy naphthalene, ammonium thiocyanate, National Aniline Color Precursors #1, #2, and #4, thiourea, 1-naphthaledehyde benzoylhydrazone, the metal behenates, octadecyl amine vanadate, methyl orange etc. can be used but tend to be less suitable to this invention.

Thus, the preferred embodiment of this invention provides a printed form suitable for use in paper-based feedback systems wherein part of the printing is visible (e.g. test instructions and the like) and other parts are hidden entries comprising latent images.

The following non-limiting example illustrates the principles and practice of this invention.

EXAMPLE

Twenty-five sheets of a commercially available bond paper were mimeographed with a text setting forth a medical school examination problem. Opposite a list of visible, mimeographed entries on the bond sheets, spaces were provided for hidden entries. The top surface of a master was imaged with infrared-absorbing ink. The images consisted of textural feedback arranged to provide the hidden entries in the spaces on the mimeographed sheets, the bottom surface of the master being a DBDTO coating. The mimeographed side of a bond sheet was placed against the bottom surface of the master, and the juxtaposed sheets were fed to an infrared thermographic copying machine (3M Model 47 "Thermo-Fax" copier, also known as the "Secretary"). The juxtaposing and copying steps were repeated with the master and twenty-five bond sheets to provide twenty-five copies of the examination problem, with hidden entries in register with the text of the problem and in the appropriate spaces. A representative sampling of the latent-imaged bond sheets was examined under a microscope, but no latent images could be detected.

The reservoir of a felt tipped pen was filled with nickel rosinate dissolved in tributyl phosphate and cyclohexane. A few minutes after the first bond sheets had been run off on the thermographic copying machine, the spaces opposite the visible entries on this sheet were rubbed with the tip of the felt pen. Dark purple images corresponding to the master images were obtained almost instantaneously.

About half of the remaining, undeveloped bond sheets were placed in a file folder which was kept in a closed file cabinet for eight weeks. At various times during the 8-week period, sheets were removed and rubbed with the felt pen as before. In every case, dark, easily legible, purple images were obtained. A similar image was obtained when one of the sheets was rubbed with a wax crayon containing nickel rosinate and triphenyl phosphate and another sheet was rubbed with a felt pen containing a nickel 2-ethylhexanoate solution.

The remaining hidden entry-containing bond sheets were allowed to lay on a table top in a well-lighted and -ventilated room. After six to eight weeks, weak but legible blue or purple images could still be obtained with either of the felt pens described previously.

The person skilled in the art will appreciate that many modifications of this invention are possible. For example, due to the high contrast ratio of the developed latent image to the background of the receptor sheet, instructional materials prepared according to this invention could be adapted for use with machine grading systems employing photoelectric sensing. Such machine grading systems would merely be requirded to detect the presence or absence of a developed image.

What is claimed is:

1. A method of providing and developing hidden entries comprising the steps of:
   (1) providing intelligence in the form of preferentially radiation-absorptive image areas upon the surface of a significantly less radiation-absorptive paper-like original sheet;
   (2) juxtaposing said original sheet, a layer containing a normally stably solid vaporizable reactant material, and a receptor sheet, said receptor sheet being essentially free of materials capable of reacting with said vaporizable reactant material to produce contrasting colored complexes, said normally stably solid vaporizable reactant material being selected from the group consisting of: dithiooxamide, the N,N'-disubstituted derivatives of dithiooxamide, and an iron-complexing compound capable of forming a colored complex when reacted with the ions of an iron salt, said iron-complex compound having a benzene ring and at least two hydroxyl groups substituted in adjacent positions on said ring;
   (3) exposing the said surface of the said juxtaposed original sheet to a heat source to induce in the said image areas a localized increase in temperature and a corresponding localized vapor transfer of said vaporizable reactant material from said layer to said receptor sheet;
   (4) permitting the vapor transferred, vaporizable reactant material to condense on said receptor sheet, thereby providing a storable latent image in localized areas of said receptor sheet corresponding to said image areas of said original sheet; and
   (5) contacting said storable latent image with a sheet-like means for dispensing an image-forming coreactant whereby said image forming coreactant is transferred from said sheet-like means to said storable latent image and said storable latent image is made visible.

2. The method according to claim 1 wherein said layer of normally stably solid vaporizable reactant material comprises a coating on one major surface of the said original sheet; said juxtaposing, exposing, and permitting steps are repeated with additional receptor sheets to form additional copies of said latent-imaged receptor sheet.

3. A method according to claim 2 wherein the said coreactant is a metal salt, the metal of said metal salt being selected from the group consisting of nickel, copper, cobalt, and cadmium.

4. A method according to claim 1 wherein said original sheet contains a layer of said iron-complexing compound, said layer comprising a mirror image of said latent image.

5. A method according to claim 1 wherein said heat source is a source of infrared radiation.

References Cited

UNITED STATES PATENTS

| | | | |
|---|---|---|---|
| 3,451,143 | 6/1969 | Thomas et al. | 101—469 X |
| 3,262,386 | 7/1966 | Gordon | 101—469 X |
| 3,170,395 | 2/1965 | Gundlach et al. | 101—469 X |
| 3,076,406 | 2/1963 | Florence | 101—469 |
| 2,168,098 | 8/1939 | Groak | 117—36.2 |
| 3,481,760 | 12/1969 | Clark et al. | 117—36.2 |
| 3,363,556 | 1/1968 | Shely et al. | 101—469 |
| 3,386,379 | 6/1968 | Gundlach et al. | 101—469 |
| 3,476,578 | 11/1969 | Brinckman | 117—36.2 |
| 3,617,324 | 11/1971 | Thomas | 117—1.7 |

WILLIAM D. MARTIN, Primary Examiner

M. SOFOCLEOUS, Assistant Examiner

U.S. Cl. X.R.

35—9 R; 101—469, 470; 117—36.2; 250—65 T